Patented Dec. 15, 1931

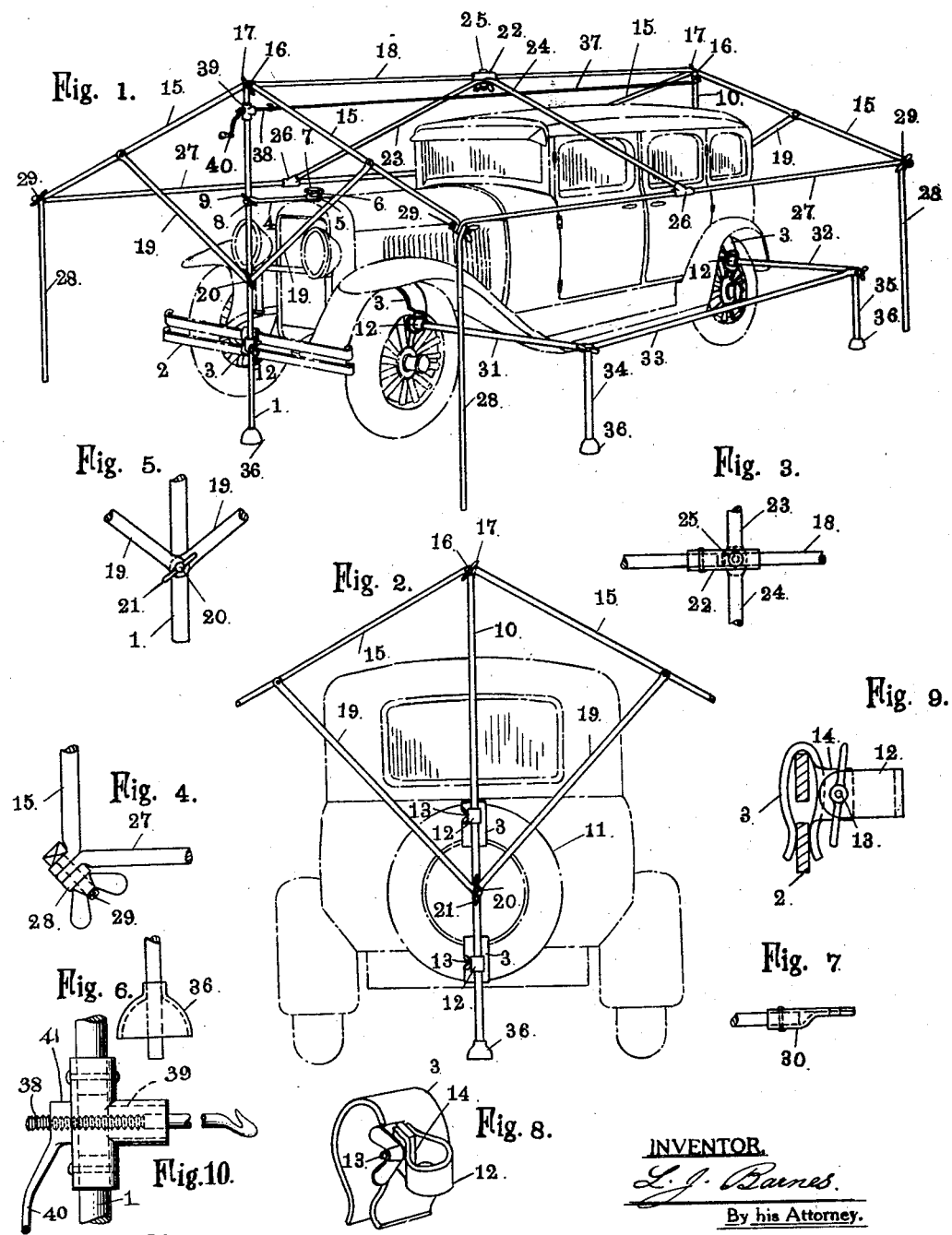

1,836,060

UNITED STATES PATENT OFFICE

LAWRENCE JOHN BARNES, OF DEE WHY, NEAR SYDNEY, NEW SOUTH WALES, AUSTRALIA

CAMPING EQUIPMENT FOR EMPLOYMENT IN CONNECTION WITH MOTOR VEHICLES

Application filed October 23, 1929. Serial No. 401,917.

The invention relates to portable camping equipment used in connection with motor vehicles.

The principal feature of the present invention consists in the attachment of the framing of a tent to a motor vehicle whereby great stability is ensured and the vehicle may be moved from one location to another without removing the tent.

The means for connecting the tent frame to the vehicle are also employed to connect the frame of a bed and table.

The parts are constructed and arranged with particular regard to providing ease of erection and rapidity in taking down.

My invention will now be described in detail by aid of the drawings wherein:—

Fig. 1 is a front perspective elevation.
Fig. 2 an end elevation.
Figs. 3 to 9 show details of the apparatus to be hereinafter described.
Figs. 3 and 4 being plans.
Figs. 5, 6, and 7, elevations.
Fig. 8, a perspective view.
Fig. 9, a sectional elevation, and
Fig. 10 is a side elevation.

The front tubular standard 1 of the tent frame is connected to the bumper bars 2 by the clasp 3 hereinafter described.

A stay 4 has an eye 5 which fits over the nozzle 6 of the radiator filler and is clamped upon it by the radiator cap 7.

At its outer end the stay is hinged upon a bolt 8 passing through a hole in the standard and having a wing nut 9.

The back standard 10 of the tent frame is connected to the spare wheel 11 by clasps 3 shown in detail Fig. 8.

The clasp is of spring metal bent to fit tightly over the tyre and rim of the wheel or when used to connect the standard to the bumper bars 2 as shown in Figs. 1 and 9 is shaped to grip tightly upon the bars.

A clip socket 12 through which the standard is passed is pivoted upon a bolt 13 passing through ears of the clip and through a lug 14 projecting from the side of the clasp.

If there is no back wheel to which the clasp may be applied, suitable provision such as a bar connected to the chassis of the vehicle will be necessary.

Inclined roof members 15 at the back and front of the frame are flattened at their upper ends and fastened to the top of the standard by a bolt 16 having a wing nut 17 the bolt also passing through the flattened end of a ridge pole 18 thereby fastening it to the standard.

Struts 19 pivoted upon the inclined members 15 have their lower ends flattened and secured to the standard by a bolt 20 having a wing nut 21 as shown in Fig. 5.

The ridge pole 18 is in two parts connected by a socket 22 (see Figs. 1 and 3) and the roof members 23 and 24 have their upper ends flattened and secured to the socket by a bolt 25 which also secures the end of one of the parts of the ridge pole in the socket.

The ends of members 23 and 24 are respectively passed into T pieces 26 which also connect the two parts of a tie bar 27 the outer ends of the tie bar being flattened and each fixed to an upright 28 (see Fig. 4) by a bolt 29 which also passes through the flattened end of roof member 15.

If wood is employed as material for the standards or for any of the roof members, jointing means is used similar to that above described as being employed with metal tubes.

The wooden member has fixed upon its end a metal socket 30 (see Fig. 7) which is flattened at the end and a hole punched through it for the clamping bolt.

The frame of a canvas stretcher bed or support for a table top is comprised of lateral members 31 and 32 connected to each end of a longitudinal member 33 and to uprights 34 and 35 by the means employed in connection with other members and described in reference to Fig. 4.

The inner ends of the members 31 and 32 are severally clamped in socket clips 12 pivoted upon clasps 3 which have been described in reference to Fig. 8 there being one clasp upon a front wheel and one upon the back wheel upon the same side of the vehicle as shown in Fig. 1.

An inverted cup 36 shown in Figs. 1, 2 and 6 is fixed upon the bottom of the standards and uprights to keep them from sinking into soft ground.

A wire rope 37 is connected at one end near the top of standard 10 and at the other end is connected to the eye of a screw 38 which passes through a T piece 39 (see Fig. 10) upon the standard 1 and has upon it the screwed boss 41 of a handle 40 the turning of which draws the screw through the T piece and strains the rope.

The canvas or other material from which the tent is made may be passed over rope 37 and be fastened to the tie bars 27 by cords at the top of its side walls.

A tent fly may be passed over the ridge pole.

When it is desired to remove the vehicle without disturbing the tent, the frame of the bed is taken away by withdrawing the clips from the wheels.

The stay 4 is disconnected from the radiator filler and folded against the standard 1.

The bolt 20 is unscrewed to release the struts 19 from the standard the struts being then folded upon the inclined roof members.

The socket clip 12 is then slackened upon the standard and the clasp raised clear of the bumper bars. The standard which fits tightly into T piece 39 is withdrawn therefrom.

The socket clips 12 upon the clasps 3 are slackened upon the back standard 10 and the clasps slid, one up, the other down upon the standard thereby releasing the wheel.

The vehicle is then clear of the framing and can be driven out of the tent.

I claim:—

1. In portable camping equipment in combination the front and back standards of the frame of a tent, inclined roof members connected to the standards, struts connecting the roof members to the standards and a ridge pole carried by the standards and means whereby the standards are detachably connected to the front and back of a vehicle as specified.

2. In portable camping equipment the means for connecting a frame member such as a standard to a vehicle said means comprised of the combination of a spring clasp and a clip socket pivoted thereon as specified.

3. In portable camping equipment the means for connecting the frame standard of a tent to the front of a motor vehicle comprising in combination a clasp fitting upon the bumper bars, a clip socket thereon a standard passing through the clip, and a stay bar connected at one end to the standard and at the other end having an eye adapted to fit over the nozzle of the radiator as specified.

4. In portable camping equipment the means for connecting the frame standard of a tent to the spare wheel at the back of a vehicle comprising in combination clasps one located at the top the other at the bottom of said wheel, a clip socket upon each of said clasps, the standard passing through said clip sockets as specified.

5. In portable camping equipment means for connecting a frame member such as a standard to a vehicle wheel said means comprising in combination a spring clasp adapted to fit over the tyre of the wheel, a lug projecting from the clasp, a clip socket having ears and a pivot bolt connecting the ears and the lug as specified.

6. In portable camping equipment the means for connecting the standard of a tent frame to the radiator of a vehicle said means comprising in combination a stay bar having an eye at one end thereof adapted to fit the nozzle of a radiator filler and means connecting the outer end of the stay bar to the standard as specified.

7. In portable camping equipment the combination of a ridge pole in two parts, inclined roof members, a socket receiving one end of each part of the ridge pole, and a bolt passing through the socket fastening the ends of the roof members thereto and fastening one of the parts of the ridge pole in the socket as specified.

8. In portable camping equipment the combination of tent frame standards one fixed upon the front and another upon the back of a vehicle, a wire rope connected at one end to one of said standards a screw to which the other end of the rope is connected a T piece upon the other standard through which the screw passes and a handle having a screw threaded boss upon said screw as specified.

In testimony whereof I have signed my name to this specification.

LAWRENCE JOHN BARNES.